United States Patent
Parry et al.

(10) Patent No.: US 6,748,443 B1
(45) Date of Patent: Jun. 8, 2004

(54) UNENFORCED ALLOCATION OF DISK AND CPU BANDWIDTH FOR STREAMING I/O

(75) Inventors: William G. Parry, Bellevue, WA (US); David S. Bakin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 481 days.

(21) Appl. No.: 09/583,451

(22) Filed: May 30, 2000

(51) Int. Cl.[7] .............................. G06F 15/16; H04J 3/16
(52) U.S. Cl. ..................... 709/232; 709/235; 370/468
(58) Field of Search ............................. 709/226, 232, 709/219, 235, 233, 224; 370/468, 235

(56) References Cited

U.S. PATENT DOCUMENTS

| | | | | |
|---|---|---|---|---|
| 5,675,732 A | * | 10/1997 | Majeti et al. | 709/235 |
| 5,701,465 A | * | 12/1997 | Baugher et al. | 707/10 |
| 5,884,037 A | * | 3/1999 | Aras et al. | 709/226 |
| 5,909,443 A | * | 6/1999 | Fichou et al. | 370/412 |
| 5,935,206 A | * | 8/1999 | Dixon et al. | 709/219 |
| 6,256,669 B1 | * | 7/2001 | Hurwitz | 709/224 |
| 6,262,974 B1 | * | 7/2001 | Chevalier et al. | 370/232 |
| 6,292,834 B1 | * | 9/2001 | Ravi et al. | 709/233 |
| 6,307,866 B1 | * | 10/2001 | Hayter | 370/468 |
| 6,320,846 B1 | * | 11/2001 | Jamp et al. | 370/235 |
| 6,590,865 B1 | * | 7/2003 | Ibaraki et al. | 370/230 |
| 6,594,279 B1 | * | 7/2003 | Nguyen et al. | 370/468 |

* cited by examiner

Primary Examiner—Krisna Lim
(74) Attorney, Agent, or Firm—Lee & Hayes, PLLC

(57) ABSTRACT

A system includes a resource manager that provides unenforced allocation of streaming I/O bandwidth from streaming I/O bandwidth providers (e.g., CPU, disk, etc.) to streaming I/O bandwidth consumers (e.g., software application, television, etc.). Unenforced allocation denotes that bandwidth allocation in response to a consumer request is not guaranteed, nor is a consumer guaranteed that, once bandwidth has been allocated, it will not be de-allocated and reclaimed by the resource manager for allocation to another bandwidth consumer, based on a priority assigned to the bandwidth consumers.

A bandwidth manager is included in a streaming I/O bandwidth provider that provides unenforced allocation from that particular provider to streaming I/O bandwidth consumers, in the same manner as the resource manager described above.

Adaptive applications (consumers) are described which can submit a modified request for less provider bandwidth from a bandwidth provider if an initial request for bandwidth is denied by the consumer. The adaptive application can operate adequately, if not optimally, on the lesser amount of bandwidth, if it is allocated.

39 Claims, 4 Drawing Sheets

DETERMINING BANDWIDTH AVAILIBILITY
(STEP 204 OF FIG. 3)

*Fig. 4*

UNENFORCED ALLOCATION OF DISK AND CPU BANDWIDTH FOR STREAMING I/O

TECHNICAL FIELD

This invention relates to computer systems that process streaming input/output (I/O) and more particularly, to computer systems and methods for managing streaming I/O resources of the computer systems.

BACKGROUND

Computers are evolving well beyond their traditional desktop roots. In addition to conventional desktop applications (e.g., word processing, spreadsheets, email, etc.), today's personal computers (PCs) are asked to play audio and video files, play music CDs (compact discs), receive and display broadcast programming, and so forth. Much of this evolution is being driven by the continued convergence of computing, Internet, telephony, and entertainment technologies.

As a result, the look, feel, and functionality of computers are continuing to evolve for different consumer and operating environments. For instance, computers designed for home entertainment might be implemented as a set-top box or a game console, equipped with browser software, one or more tuners, EPG (electronic programming guide) software, different audio/video drivers, and gaming software. Computers designed for office use may resemble conventional desktop PCs in appearance, but be implemented with broadcast tuners, DVD (digital video disks) drives, stereo speakers with surround sound, and so forth, to offer a more enhanced computing experience. The variety and functionality of portable computers are even wider ranging as the demands of the mobile user increase.

As computers are asked to perform more diverse tasks, it is not uncommon for users to expect performance of multiple tasks simultaneously. Due to this increasing user demand, there is more demand being placed on the existing system resources to handle the various tasks. This unfortunately leads to a greater likelihood that the computer may not have sufficient resources at a requested time to accomplish all of the tasks simultaneously.

This resource shortfall is perhaps most evident for computers designed for the home entertainment environment. Such an environment makes significant use of streaming input/output (I/O) technology. Streaming technology is used, for instance, to provide full-motion video over the Internet or from another source, such as a DVD player. As the name indicates, streaming technology provides a stream of data from an input source such as a disk, video camera, computer file, etc., and renders that data to an output device, typically a video monitor or a television. In most implementations, the input of the data stream is closely synchronized with the output of the data stream, so that when a portion of the data stream is being input, another portion of the data stream is being output.

Streaming I/O technology is limited by the bandwidth of the disk to which the data is written and from which the data is read, as well as the bandwidth of the processor used to execute the streaming I/O process. As used herein with regard to a disk, the term "bandwidth" refers to the volume of data that can be written to the disk in a given amount of time. For example, a disk may have a bandwidth of 0.5 megabits per 100 milliseconds, which means that during a 100-millisecond period, the disk can receive or transmit 0.5 megabits of data. As used herein with regard to a processor, the term "bandwidth" refers to the number of instructions that the processor can execute in a given amount of time. For example, a processor may have a bandwidth of five million (5 M) instructions per second.

Components such as disks and processors that provide streaming I/O bandwidth are commonly referred to as streaming I/O bandwidth providers, or as used herein, providers. Components or applications that require bandwidth from a processor and/or a disk to operate streaming I/O functions are referred to as streaming I/O bandwidth consumers, or as used herein, consumers.

Streaming of audiovisual data imposes significant bandwidth requirements on a processor and I/O subsystem of a computer system. A single streaming I/O application can easily consume most of the bandwidth of the processor and I/O subsystem on currently available platforms. If the disk bandwidth or the processor bandwidth is exceeded, the user will experience undesirable artifacts such as video frame dropping, audio glitches, etc. It is, therefore, very important to manage disk and processor bandwidth to the greatest extent possible when processing streaming applications.

In addition, computers are sometimes required to provide multiple streaming I/O functions simultaneously. For instance, a user may request that a television integrated into an entertainment computer display video from one streaming I/O application while, at the same time, the user may want to utilize a picture-in-picture (PIP) function to display video from a different streaming I/O source. This can pose a problem if the two bandwidth consumers, taken together, require more bandwidth than the bandwidth provider has available.

In such situations, the computer is at a loss to distinguish which task should be performed and which should not. Today, applications obtain system resources on a first-come or last-come basis and usually hold the resources for as long as they require. Accordingly, the applications control resource allocation irrespective of users' desires. In the above example, if the system operates on a first-come basis, then the television application will seize control of provider bandwidth to a degree that does not allow the PIP to function. If the execution of applications is enforced, the PIP will take provider bandwidth even though there is not enough to support both the television and the PIP. In that case, both the television and the PIP will not operate properly. If the system is designed to operate on an enforced last-come basis, the PIP will run and may consume too much bandwidth to allow the television to operate properly and the television application could exhibit undesirable artifacts or it could be terminated altogether.

Thus, as the demand for streaming I/O resources continues to grow, there is greater need for techniques to manage streaming I/O provider bandwidth to provide sufficient bandwidth to streaming I/O consumers for the consumers to operate simultaneously without exhibiting undesirable artifacts.

SUMMARY

Described herein are architectures and methods that provide unenforced streaming I/O bandwidth resource management in computer systems having streaming I/O bandwidth providers and streaming I/O bandwidth consumers.

A streaming I/O consumer resource manager is described for managing streaming I/O bandwidth of a disk bandwidth provider and a processor bandwidth provider. The streaming I/O resource management provides unenforced allocation of disk and processor bandwidth to streaming I/O bandwidth consumers. Unenforced allocation means that a bandwidth consumer may or may not get thee bandwidth it requests. It also means that once bandwidth has been allocated to a bandwidth consumer, the bandwidth is not guaranteed and may be re-allocated to another bandwidth consumer. Such unenforced allocation provides a relatively simple and inexpensive way to operate a multi-application computing device.

In the described implementation, streaming I/O bandwidth providers (as discussed herein, a disk and a processor) first determine the approximate bandwidth provider streaming capacity, which is the total amount of bandwidth available for allocation to streaming I/O bandwidth consumers. This can be accomplished in different ways. For example, when the computer system is initialized, approximations can be made by accessing a lookup table containing such information for several types of disks and processors. Alternately, approximations can be made by executing benchmark tests using the bandwidth providers to gain empirical data as to the capacity.

Streaming I/O consumers, such as applications, acquire provider (disk or processor) bandwidth by calling a resource management system with the approximate quantity of bandwidth they require. The resource management system may reside within an operating system of the computer system or it may be included within the provider itself, such as in disk controller software.

The resource management system determines if the requested bandwidth is available. This can be accomplished in the described embodiment by obtaining bandwidth in two ways. First, bandwidth that is unused can be allocated to satisfy the request in whole or in part. If the request cannot be satisfied from unused bandwidth, the resource manager may also take bandwidth that is currently allocated to a different consumer. To re-allocated bandwidth that has already been allocated, the consumer requesting bandwidth must have a higher priority than the consumer that holds the bandwidth that is to be re-allocated.

If the resource manager can accumulate sufficient bandwidth from a provider to satisfy the consumer's request, the consumer is allocated provider bandwidth according to the request. If sufficient provider bandwidth cannot be found, the requested bandwidth is denied. If the requested bandwidth is denied, and if the consumer (application) is designed so that it is adaptive, the consumer can submit a second request to the resource manager to request less bandwidth than the initial request, but sufficient bandwidth for the consumer to operate at an acceptable, if not optimal, performance level.

DETAILED DESCRIPTION

This disclosure describes methods and systems that provide unenforced streaming I/O bandwidth resource management in computer systems having streaming I/O bandwidth providers and streaming I/O bandwidth consumers. A streaming I/O bandwidth resource is a streaming I/O bandwidth provider that has a finite quantity of bandwidth available to streaming I/O bandwidth consumers in a computer system that is utilized to perform streaming I/O functions. Examples of streaming I/O providers include hardware devices such as disks (hard drives, CD-ROMs, DVDs), processors, memory, USBs and USB devices, network bandwidth, and so forth. Examples of streaming I/O consumers include any application or component that utilizes bandwidth of a streaming I/O provider.

Managing limited system streaming I/O resources is becoming increasingly important as computer systems are asked to perform more tasks simultaneously. Consider, for example, a TV-enabled computing system (e.g., broadcast PC, set-top box, etc.) that has a television which displays streaming I/O applications from various sources, such as a DVD drive, hard drive files, the Internet, a tape player, etc. The television includes picture-in-picture (PIP) capability that also displays streaming I/O applications from these sources. The television is configured so that the television displays streaming I/O from one file on a hard disk drive ("disk") source on its main screen while, at the same time, the PIP function displays streaming I/O from another file on the disk. The streaming I/O process for both the television and the PIP applications require processing time by a processor in the computing system.

Both the television and the PIP are streaming I/O consumers that require bandwidth from the streaming I/O providers (processor and disk). But the processor and the disk have a limited amount of bandwidth to allocate to the two streaming I/O consumers. If both applications run when there is not enough provider bandwidth to support both applications, one or both applications will exhibit artifacts or will be terminated.

The resource management architecture may be implemented in many diverse environments and computing contexts. For discussion purposes, the architecture is described in the context of a computing system for the consumer entertainment environment, which might take the form of a TV-enabled personal computer as described above. After describing a comprehensive computer system in which the described embodiment may be implemented, the discussion will refer to a simplified diagram having only the components that will be discussed. This diagram (FIG. 2) will allow the exemplary system to be described in greater detail.

Comprehensive Computer System

Figure 1:
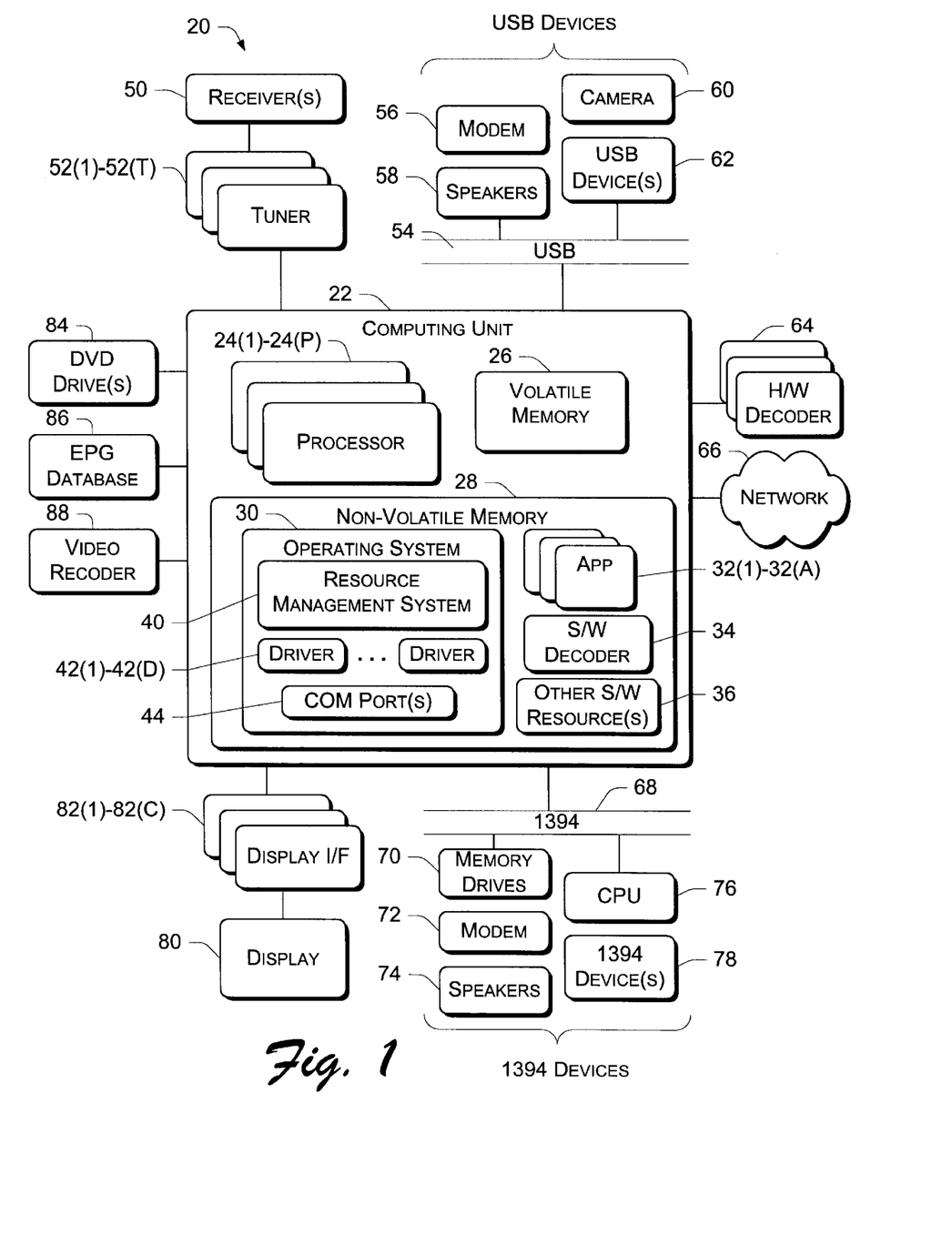
FIG. 1 is a block diagram of an exemplary computing unit in the form of an entertainment computing unit in accordance with one embodiment.

FIG. 1 shows an entertainment computing system 20 having a computing unit 22 and multiple peripheral components that connect or otherwise interface with the computing unit 22. The computing unit 22 has one or more processors 24(1), 24(2), . . . , 24(P), volatile memory 26 (e.g., RAM), and non-volatile memory 28 (e.g., ROM, Flash, hard disk, CD ROM, etc.).

An operating system 30 is stored in non-volatile memory 28. The operating system 30 is a multi-tasking operating system that, when loaded into volatile memory 26 and executed on one or more processors 24, supports simultaneous execution of multiple applications 32(1), 32(2), . . . , 32(A). One preferred operating system is a Windows-brand operating system sold by Microsoft Corporation. It is noted, however, that other operating systems may be employed.

Applications 32(1)–32(A) are representative of many diverse types of application programs that may be run on the entertainment computing system 20. Examples include an EPG program, browser, channel navigation, audio and video players, audio/video recording program, stereo program, and so forth. A software decoder 34 (e.g., an MPEG software decoder) and other software resources 36 are also shown stored in non-volatile memory 28.

The operating system 30 has a resource management system 40 that manages the resources of the entertainment computing system 20 for allocation to the applications 32(1)–32(A). The resource management system 40 may be implemented separately from the operating system 30, but is illustrated as being integrated within the operating system. The resource management system 40 is described below in more detail with reference to FIG. 2.

The operating system 30 also has multiple software drivers 42(1), . . . , 42(D) for various associated peripheral components in the computing system 20. One or more COM (communication) ports 44 are also illustrated as being part of the operating system 30. A representative collection of peripheral components is illustrated surrounding the computing unit 22. The entertainment computing system 20 has one or more receivers 50 to receive broadcast data, such as television programming and the like. The receiver(s) 50 may be an analog television receiver, a digital broadcast receiver (e.g., satellite dish, cable modem), and RF receiver, and so forth. The receiver(s) 50 are coupled to one or more tuners 52(1)–52(T) which tune to frequencies of the carrier signals transporting the data.

A USB bus 54 is connected to the computing unit 22 to interface many different kinds of USB compatible peripheral components. Examples of such components include a modem 56, speakers 58, a still or video camera 60, and other USB devices 62.

One or more hardware decoders 64(1), 64(2), . . . , 64(H) are coupled to the computing unit 22 to decode various types of data streams. Exemplary decoders include video decoders, which use such standards as MPEG-1, MPEG-2, MPEG-4, H.261, and H.263, and audio decoders.

The computing unit 22 is coupled to a network 66 to interface with other computers. The network 66 is representative of many diverse types of networks, including LANs, WANs, Internet, intranets, and wireless networks. One of the resources managed by the resource management system 40 is the bandwidth afforded at any given time by the network 66.

A 1394 serial bus 68 is connected to the computing unit 22 to interface many different kinds of 1394 compatible peripheral components. Examples of such components include memory drives 70 (e.g., disk drive, tape drive, CD ROM drive, etc.), modem 72, speakers 74, a CPU (central processing unit) 76, and other 1394 devices 78. Further discussion will refer to a memory drive 70 as being a hard disk drive ("disk"). It is noted that although USB and 1394 buses are shown in this exemplary system, other bus architectures may be additionally or alternatively used, such as SCSI, ISA (Industry Standard Architecture), and PCI (Peripheral Component Interconnect) buses.

The entertainment computing system 20 has a display 80, which may be a television set or a computer monitor. The display is interfaced with the computing unit 22 via one or more display interfaces 82(1), 82(2), . . . , 82(C), which are representative of a video port, overlay and video memory.

Other exemplary peripheral devices coupled to the computing unit 22 include DVD player 84, an EPG database 86, and a video recorder 88. The EPG database 86 holds the programming information that fills the tiles of the EPG user interface (UI). The programming information includes such items as program title, start time, duration, actor/actress, summary description, and so forth. The EPG information is received via normal means (e.g., via cable modem or embedded within the VBI interval) and stored in the EPG database 86. The computing unit 22 runs queries on the EPG database to locate shows or other programming content, and presents the information to the user in a graphical UI. The video recorder 84 may be in the form of a video cassette recorder, a disk-based recorder, and the like. The computing unit 22 can direct the video recorder 84 to record various programming received via the tuners 52 or over the network 66.

In addition to the entertainment-focused components described above, it is further noted that the computing system 20 may also be configured as a fully functional computer that can perform typical desktop applications familiar to computers. A variety of different applications can be loaded and executed on system, such as word processing applications, spreadsheet applications, database applications, scheduling applications, financial applications, educational applications, and so forth.

The collection of components illustrated in FIG. 1 shows exemplary types of resources that are managed by the resource manager system 40. Among them are drivers, ports, tuners, decoders, USB devices, network bandwidth, 1394 devices, display interfaces, recorders, memory drives, and so on. Many other components may be added to the system, and one or more of the illustrated components can be removed.

Exemplary Computer System

Figure 2:
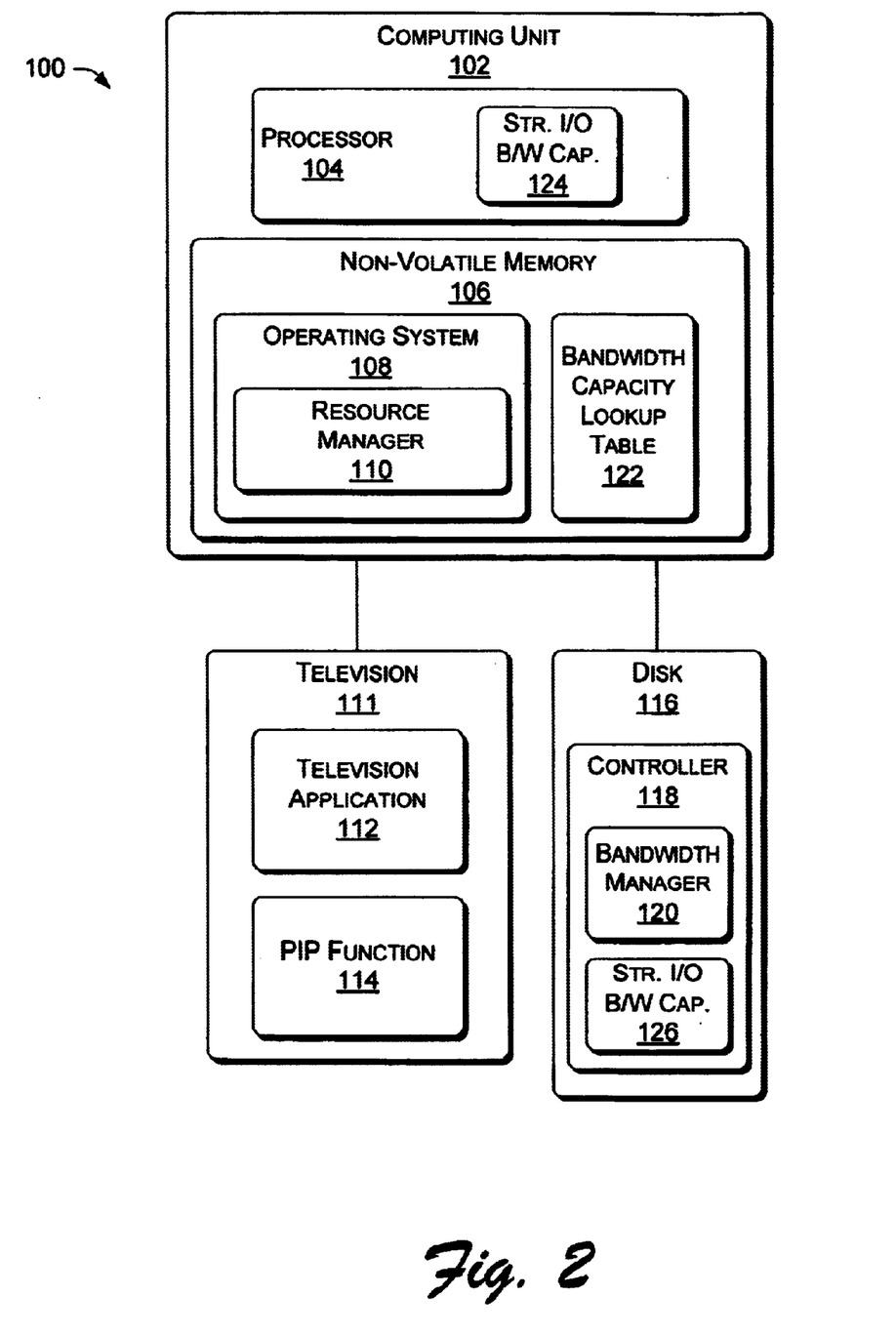
FIG. 2 is a simplified version of the block diagram of FIG. 1 in accordance with the described embodiment.

FIG. 2 shows one exemplary computer system 100 that is a simplified version of the comprehensive entertainment computing system 20 of FIG. 1. The computer system 100 includes a computing unit 102 having a processor 104 and non-volatile memory 106. The non-volatile memory 106 contains an operating system 108 having a resource manager 110 resident therein. It is noted that, although the resource manager 110 is shown as residing within the operating system 108, the resource manager 110 could be integrated within the processor 104, or it could be a module that functions apart from the operating system 108.

A television 111 is connected to the computing unit 102, and is capable of executing a television application 112 using streaming I/O. The television 111 is also equipped with a PIP function 114. A disk 116 is connected to the computing unit 102. The disk 116 includes a controller 118 that has a bandwidth manager 120 resident therein. The resource manager 110 is configured to allocate streaming I/O bandwidth from the processor 104 to the television application 112 and the PIP function 114. The bandwidth manager 120 of the disk 116 is configured to allocate streaming I/O bandwidth from the disk 116 to the television application 112 and the PIP function 114. It is noted that the resource manager 110 may be configured to allocate both bandwidth from the processor 104, and the disk 116. If the resource manager 110 is configured in that manner, the bandwidth manager 120 of the disk 116 would be eliminated from the configuration. Alternatively, the bandwidth manager 120 may be utilized to allocate disk bandwidth to disk bandwidth consumers even when there is no resource manager 110 implemented to allocate processor bandwidth to consumers.

A bandwidth capacity lookup table 122 is stored in the non-volatile memory 106 of the computing unit 102. The content of the bandwidth capacity lookup table 122 depends on the function of the resource manager 110. If the resource manager 110 only controls allocation of bandwidth for the processor 104, then the bandwidth capacity lookup table 122 will contain bandwidth capacity data for a plurality of processors. If the resource manager 110 also controls allocation of bandwidth for the disk 116, then the bandwidth capacity lookup table 122 will also contain bandwidth capacity data for a plurality of disks. As an alternative to storing a bandwidth capacity lookup table 122, each provider may provide its bandwidth capacity to the resource manager 110 upon initialization of the computing unit 102. In the present example, the processor 104 contains a bandwidth capacity field 124 that stores the processor bandwidth capacity for the processor 104, which is available to the resource manager 110. In addition, the controller 118 of the disk 116 contains a bandwidth capacity field 126 that stores the disk bandwidth capacity for the disk 116. Further functions of the components of the computer system 100 will be discussed in greater detail with reference to FIG. 3 and FIG. 4.

Figure 3:
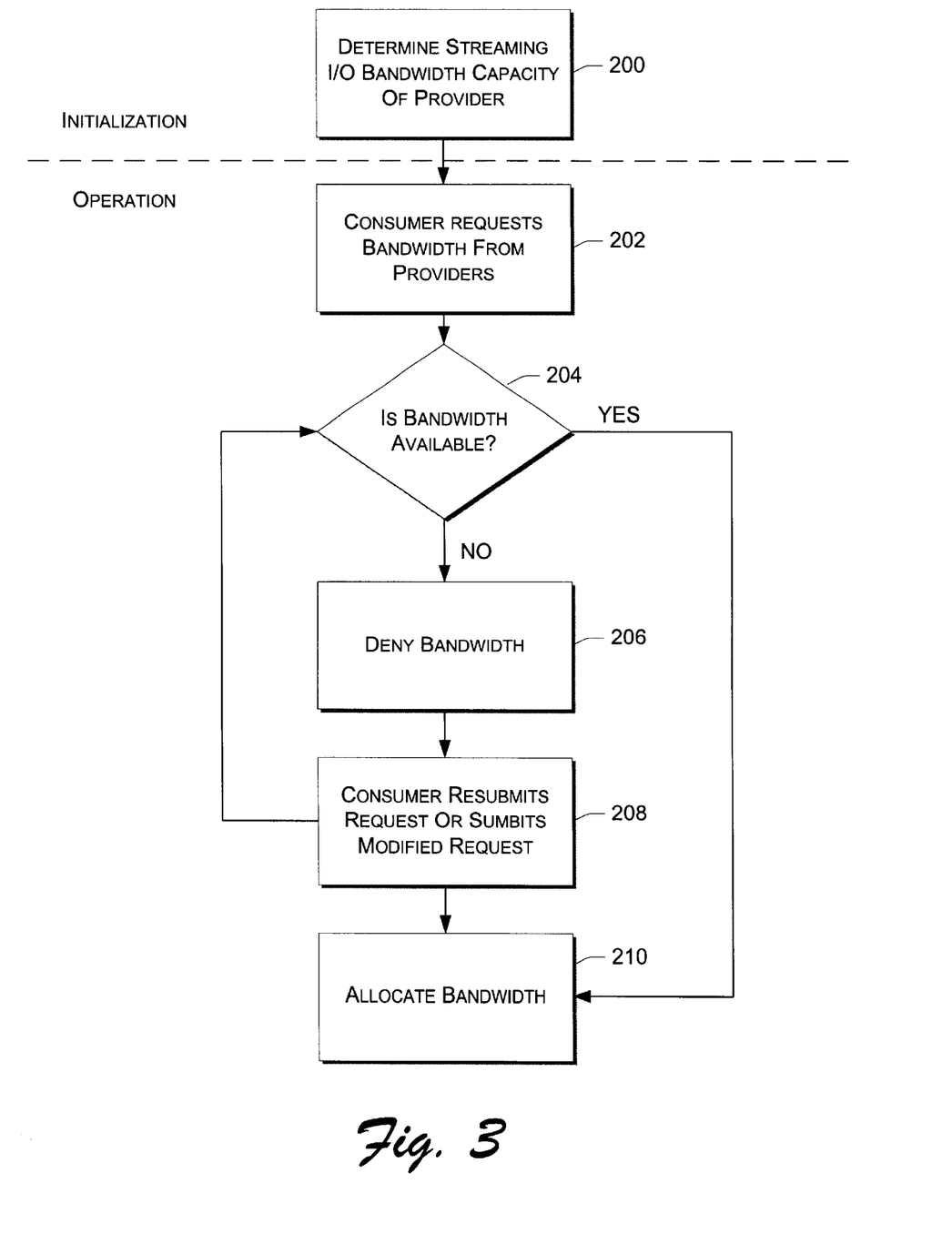
FIG. 3 is a flow diagram of unenforced bandwidth provider resource allocation.

FIG. 3 is a flow diagram that depicts the allocation of bandwidth from a streaming I/O bandwidth provider to streaming I/O bandwidth consumers. At step 200, the streaming I/O capacities of the bandwidth providers are determined. This determination is performed only at initialization, so the resource manager 110 and/or the bandwidth manager 120 will know how much bandwidth can be allocated for each provider. This can be done in one of several ways, depending on the configuration of the system. If the system includes a bandwidth capacity lookup table 122, then the bandwidth capacity lookup table 122 contains bandwidth capacities for one or more of the streaming I/O bandwidth providers in the system 20. Alternatively, each of the streaming I/O bandwidth providers - the processor 104 and the disk 116 in the present example - may store the total amount of bandwidth that may be allocated from that provider. As shown in FIG. 2, the processor 104 includes this information in the bandwidth capacity field 124, and the disk 116 includes this information in the bandwidth capacity field 126. For discussion purposes, assume that the processor bandwidth capacity is five (5) million instructions (megaflops) per second, and that the disk I/O bandwidth capacity is five (5) megabits per millisecond (Mb/msec).

Using the example of the television application 112 and the PIP function 114 as bandwidth consumers and assuming the television application 112 is launched first, at step 202, the television application 112 requests streaming I/O bandwidth from the processor 104 and the disk 116. As shown, the request for processor bandwidth is made through the resource manager 110 and the request for disk bandwidth is made through the bandwidth manager 120. Also assume for this example that the television application 112 requires three (3) megaflops of processor bandwidth and three (3) Mb/msec of disk bandwidth to operate optimally.

Figure 4:
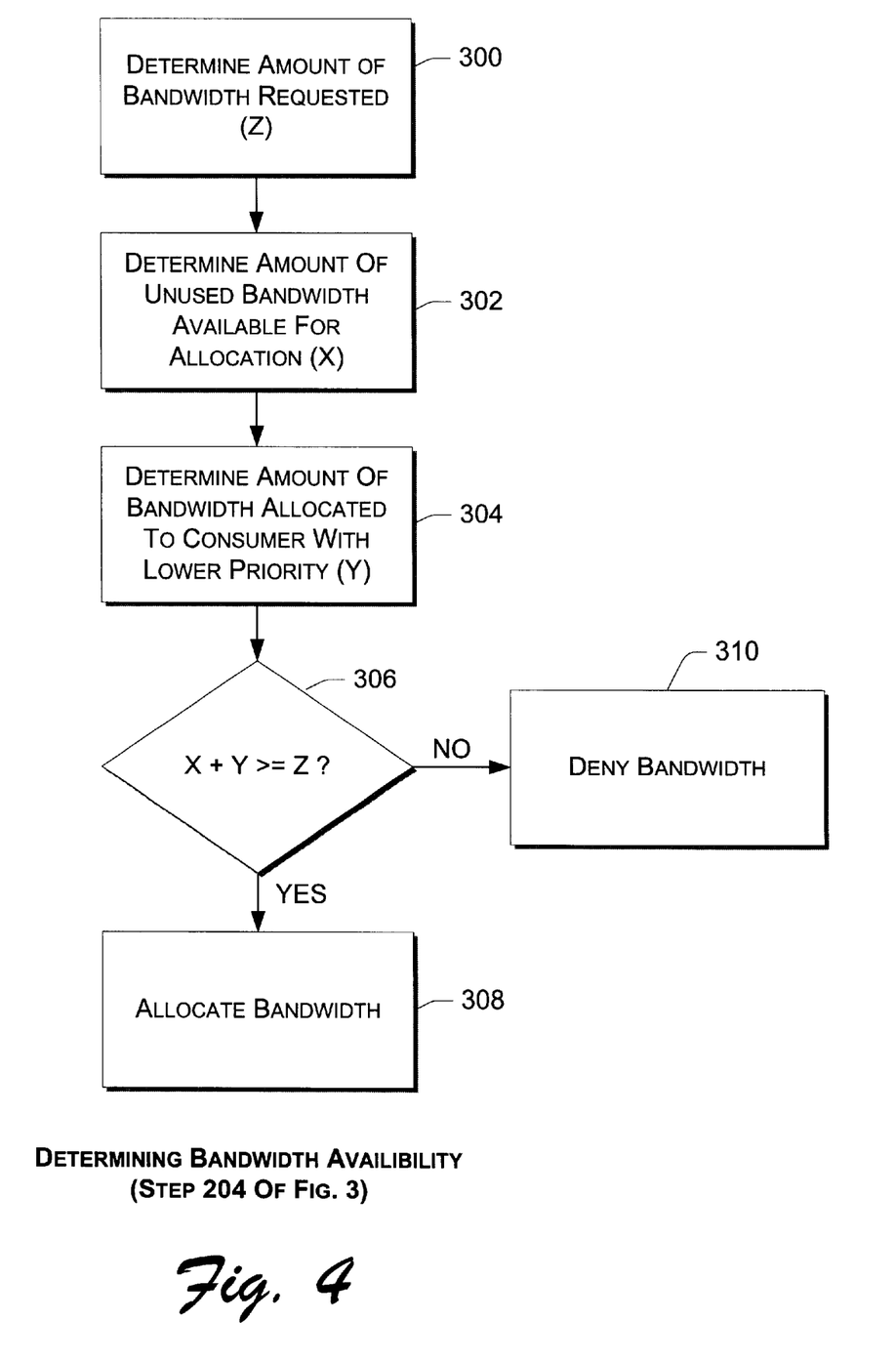
FIG. 4 is a flow diagram depicting a method for determining if sufficient bandwidth is available to satisfy a bandwidth request.

At step 204, the resource manager 110 determines if there is sufficient processor bandwidth to satisfy the processor bandwidth request from the television application 112, and the bandwidth manager 120 determines if there is sufficient disk bandwidth available to satisfy the disk bandwidth request from the television application 112. The details of this determination are shown in FIG. 4, which will be discussed in detail below. However, since it is assumed that the television application 112 was the first application launched, it is apparent that there is sufficient processor bandwidth and disk bandwidth to process the television application 112 sufficiently.

At step 206, ("NO" branch of step 204), if there is not sufficient processor bandwidth and/or disk bandwidth to satisfy the requests, the bandwidth is not allocated to the consumer, in this case, the television application 112. If the bandwidth is denied (step 208, "YES" branch, of step 206), the television application 112 can resubmit the request to the resource manager 110 and the bandwidth manager 120. At this time, the television application 112 may modify its request and request less processor bandwidth or disk bandwidth if the television application 112 can operate sufficiently with less bandwidth. If, however, there is sufficient processor bandwidth and disk bandwidth to satisfy the requests, the bandwidth is allocated to the television application 112 (step 210).

Once the application for the television application 112 is running, assume now that a viewer launches the PIP function 114. Also assume that the PIP function 114 requires three (3) megaflops of processor bandwidth and three (3) megabits of disk bandwidth for optimal operation.

Since the streaming I/O bandwidth capacity of the bandwidth providers has already been determined at initialization, step 200 is not performed again. At step 202, the PIP function 114 requests streaming I/O bandwidth from the processor 104 and the disk 116, through the resource manager 110 and the bandwidth manager 120, respectively.

At step 204, the resource manager 110 determines if there is sufficient processor bandwidth to satisfy the processor bandwidth request from the PIP function 114, and the bandwidth manager 120 determines if there is sufficient disk bandwidth available to satisfy the disk bandwidth request from the PIP function 114. Since the television application 112 is utilizing three (3) megaflops of processor bandwidth of an available five (5) megaflops of processor bandwidth, the bandwidth request of the PIP function 114 cannot be satisfied initially.

However, in one embodiment of the computer system 100, a priority-based system for determining allocation is provided, wherein each streaming I/O bandwidth consumer is assigned a priority. In such a system, as in the present example, if the PIP function 114 has a higher priority than the television application 112, then bandwidth allocated to the television application 112 can be reclaimed and allocated to the PIP function 114.

The determination process of step 204 is depicted in greater detail in FIG. 4. FIG. 4 is a flow diagram that depicts the manner in which the resource manager 110 and the bandwidth manager 120 determine if sufficient bandwidth is available from the processor 104 and the disk 116, respectfully. The present discussion will focus on the PIP function 114 of the example presented, since the television application 112 was launched when no other bandwidth consumer was operating. If the television application 112 is launched while other streaming I/O bandwidth consumers are operating, the process described below would take place as described, except that the resource manager 110 would perform the function that is performed by the bandwidth manager 120.

At step 300 of FIG. 4, the bandwidth manager 120 determines how much bandwidth is being requested by the PIP function 114. For discussion purposes, the amount of the disk bandwidth requested by the PIP function 114 is represented by the variable "Z" which, in the present example, is three (3) megaflops of processor bandwidth and three (3) Mb/msec of disk bandwidth. At step 302, the bandwidth manager 120 determines the amount of unused bandwidth that is available for streaming I/O from the processor 104 and the disk 116. For discussion purposes, the amount of unused bandwidth available for allocation to the PIP function 114 is represented by the variable "X." In the present example, X is two (2) megaflops of processor bandwidth and two (2) Mb/msec of disk bandwidth.

The bandwidth manager 120 may also reclaim bandwidth from the processor 104 or the disk 116 that has been allocated to a streaming I/O bandwidth consumer other than the PIP function 114, and re-allocate that bandwidth to the other consumer (step 304). For discussion purposes, bandwidth that is allocated to one consumer that may be re-allocated to the requesting consumer is represented by the variable "Y." In this example, bandwidth re-allocation will be discussed with reference to the television application 112 since the television application 112 is the only other bandwidth consumer executing at the time the PIP function 114 is launched.

Whether bandwidth is re-allocated or not depends on a priority that is assigned to the television application 112 and the PIP function 114. It is noted that the priority of streaming I/O bandwidth consumers may be assigned by the operating system 108, the resource manager 110, the bandwidth manager 120 or any other component in the computer system 100 that is capable of doing so.

In the present example, it is assumed that the television application 112 has a higher priority than the PIP function 114 since a viewer typically places a video program of primary interest to the user on a television screen and a video program of secondary interest to the user in a PIP window. Since the PIP function 114 does not have a higher priority than the television application 112, the television function 114 retains the bandwidth that has been allocated to it and the bandwidth requested by the PIP function 114 is denied. Therefore, there is no bandwidth available to the PIP function 114 from re-allocation based on priority and Y is equal to zero.

At step 306, the resource manager 110 determines if there is enough processor bandwidth to satisfy the request of the PIP function 114. Also at step 306, the bandwidth manager 120 determines if there is enough disk bandwidth to satisfy the request of the PIP function 114. If the amount of unused bandwidth (X) plus the amount of bandwidth that can be re-allocated from another bandwidth consumer (Y) is equal to or greater than the amount of bandwidth requested (Z), the bandwidth is allocated at step 308. If X plus Y is less than Z, then the bandwidth is denied at step 310.

In the present example, X is equal to two (2) megaflops of processor bandwidth and two (2) Mb/msec of disk bandwidth; Y is equal to zero (0) which totals two (2) megaflops of processor bandwidth and two (2) Mb/msec of disk bandwidth. The amount of bandwidth requested (Z), however, is three (3) megaflops of processor bandwidth and three (3) Mb/msec of disk bandwidth. Therefore, Z is less than X plus Y so the requested bandwidth is denied at step 310.

Referring back to FIG. 2, the bandwidth is denied to the PIP function 114 at step 206. At step 208, the PIP function 114 may resubmit the same request for bandwidth from the processor 104 and the disk 116 on the chance that there will be more bandwidth available for the subsequent request. However, if the PIP function 114 is an adaptable application, it can modify the criteria of the initial request and resubmit the modified request.

For example, if the PIP function 114 can operate adequately, though not optimally, utilizing two (2) megaflops of processor bandwidth and two (2) Mb/msec of disk bandwidth, then it will modify its initial request to request only this amount of bandwidth from the processor 104 and the disk 116.

The PIP function 114 submits the modified request at step 204 of FIG. 2. At step 300 of FIG. 3, the amount of bandwidth requested is determined, in this example, by the resource manager 110 and the bandwidth manager 120. At step 302, the amount of unused bandwidth is determined (two (2) megaflops and two (2) Mb/msec) and, since the PIP function 114 does not have a higher priority than the television application 112, it is determined that there is no bandwidth available for re-allocation (step 304). The amount of unused bandwidth (X) plus the amount of bandwidth available for re-allocation (Y) equals the amount of bandwidth requested (Z). Therefore, the bandwidth requested in the modified request is allocated to the PIP function 114 (step 308, FIG. 3; step 210, FIG. 2).

Conclusion

The embodiments described herein provide a computer system with unenforced bandwidth allocation from streaming I/O bandwidth providers to streaming I/O bandwidth consumers that is more simple and cheaper to implement than a true real-time system, but that provides significant improvement over systems that utilize simple first-come or last-come queues. The embodiments described herein also allow for adaptive applications that can adapt to run at less than optimal, but acceptable, levels instead of being terminated by the system.

There are advantages and disadvantages to implementing such an unenforced resource allocation system. One disadvantage is that the allocation is not guaranteed. Another drawback is that a streaming I/O consumer, such as an application, can simply "butt in" and take provider bandwidth. There is no guarantee that other consumers will get the bandwidth they need to operate properly. However, in a closely controlled cooperative system such as a set-top box, a designer typically has control over all the applications that will be running in the system. Therefore, the designer can implement applications so that uncontrolled resource consumption does not occur.

In contrast to this disadvantage, there are several advantages to implementing an unenforced resource allocation system. One advantage is that, while the implementation is not real-time, it provides near-real-time processing without having to implement a system-wide real-time processing environment, which requires much more overhead that the described implementation.

Another advantage to the described implementation is that if a consumer uses more bandwidth than it was allocated, a competing consumer is not terminated, as in the case with other resource management schemes. If a consumer is denied bandwidth allocation, the consumer may submit an alternate bandwidth request that differs from the original request. For instance, in the example given above, the PIP application was able to resubmit a modified bandwidth request after its initial request for bandwidth had been denied. As a result, the PIP function was able to execute adequately without causing undesirable artifacts in the television application.

Thus, the unenforced system can accommodate adaptive applications, which can submit a secondary request if a primary request cannot be satisfied. It is also possible that once an adaptive application has determined how much bandwidth is available, it can then make a decision not to launch at that particular time based on that information, thereby saving undesired artifacts from occurring in several applications.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method of allocating bandwidth of a streaming input/output (I/O) bandwidth provider to a streaming I/O bandwidth consumer, comprising:

receiving, from the streaming I/O bandwidth consumer, a request for use of at least a portion of bandwidth of the streaming I/O bandwidth provider;

accessing a provider lookup table to determine a streaming capacity of the streaming I/O bandwidth provider, the provider lookup table including streaming capacities for one or more streaming I/O providers:

determining if the requested bandwidth is available for allocation to the streaming I/O bandwidth consumer by taking the difference between the streaming capacity of the streaming I/O bandwidth provider and an amount of streaming I/O provider bandwidth previously allocated;

allocating the requested bandwidth to the streaming I/O bandwidth consumer if the requested bandwidth is available from the streaming I/O bandwidth provider; and denying the request if the bandwidth requested from the streaming I/O bandwidth provider is unavailable.

2. The method as recited in claim 1, further comprising:

receiving a subsequent request from the same streaming I/O bandwidth consumer for use of at least a portion of the bandwidth of the streaming I/O bandwidth provider if the initial request was denied, the subsequent request requesting a lower amount of bandwidth;

determining if the streaming I/O bandwidth provider can accommodate the subsequent request;

allocating the streaming I/O bandwidth provider bandwidth requested in the subsequent request to the streaming I/O bandwidth consumer if the requested bandwidth is available; and denying the request if the bandwidth requested from the streaming I/O bandwidth provider is unavailable.

3. The method as recited in claim 1, further comprising determining a streaming capacity of the bandwidth provider by executing empirical benchmark testing on the streaming I/O bandwidth provider in the event that the streaming I/O bandwidth provider is not listed in the provider lookup table.

4. The method as recited in claim 1, wherein the streaming I/O bandwidth provider comprises a peripheral storage device.

5. The method as recited in claim 1, wherein the streaming I/O bandwidth provider comprises a disk.

6. The method as recited in claim 5, wherein bandwidth comprises a number of bytes that can be transferred to/from the disk within a specified time unit.

7. The method as recited in claim 1, wherein the streaming I/O bandwidth provider comprises a processor.

8. The method as recited in claim 10, wherein bandwidth comprises a number of instructions the processor can execute within a specified time unit.

9. The method as recited in claim 1, wherein the streaming I/O bandwidth consumer comprises a software application.

10. The method as recited in claim 1, wherein operation of the streaming I/O bandwidth consumer is not terminated upon denial of a request for bandwidth from the streaming I/O bandwidth provider.

11. The method as recited in claim 1, wherein allocation of bandwidth from tie streaming I/O bandwidth provider to a first streaming I/O bandwidth consumer may be preempted by allocation of at least a portion of the bandwidth to a second streaming I/O bandwidth consumer.

12. The method as recited in claim 1, wherein availability of bandwidth from the streaming I/O bandwidth provider is determined by an amount a of bandwidth of the streaming I/O bandwidth provider that is unused.

13. The method as recited in claim 1, further comprising multiple streaming I/O bandwidth consumers, each having a priority assigned thereto, and wherein availability of bandwidth from the streaming I/O bandwidth provider is determined by the priority assigned to each of the streaming I/O bandwidth consumers.

14. The method as recited in claim 1, wherein the streaming I/O bandwidth consumer determines whether to launch based on availability of bandwidth from the streaming I/O bandwidth provider.

15. One or more computer-readable media containing computer executable instructions which, when executed on a computer, perform the steps recited in claim 1.

16. A method of allocating processor bandwidth to a processor bandwidth consumer, comprising:

determining processor bandwidth availability for allocation to the processor bandwidth consumer to meet processing requirements of the processor bandwidth consumer by referencing an entry in a bandwidth lookup table that identifies total processor bandwidth corresponding to a relevant processor and subtracting bandwidth currently allocated to one or more other bandwidth consumers;

allocating processor bandwidth to the processor bandwidth consumer if there is sufficient processor bandwidth available; and denying processor bandwidth if sufficient processor bandwidth is not available.

17. The method recited in claim 1, wherein:

the processor bandwidth consumer is a first processor bandwidth consumer having a priority assigned thereto; and the determining comprises determining if sufficient processor bandwidth can be allocated from processor bandwidth used by a second processor bandwidth consumer having a lower priority than the first processor bandwidth consumer.

18. The method recited in claim 1, wherein if the processor bandwidth is denied, the method further comprises;

determining if there is processor bandwidth available to allocate to the processor bandwidth consumer to meet alternate processing requirements of the same processor bandwidth consumer;

allocating processor bandwidth to the processor bandwidth consumer if there is sufficient processor bandwidth available to meet the alternate processing requirements of the processor bandwidth consumer; and denying processor bandwidth if sufficient processor bandwidth is not to available.

19. A method of allocating disk bandwidth to a disk bandwidth consumer, comprising:

referring to a disk bandwidth lookup table to determine a streaming bandwidth capacity for a system disk;

determining disk bandwidth availability for allocation to a disk bandwidth consumer as the difference between the streaming bandwidth capacity for the system disk and streaming bandwidth that is currently allocated from the disk;

determining if the available bandwidth is sufficient to meet disk I/O requirements of the disk bandwidth consumer;

allocating disk bandwidth to the disk bandwidth consumer if there is sufficient disk bandwidth available; and denying disk bandwidth if sufficient disk bandwidth is not available.

20. The method recited in claim 19, wherein:

the disk bandwidth consumer is a first disk bandwidth consumer having a priority assigned thereto; and the determining comprises determining if sufficient disk bandwidth can be allocated using disk bandwidth utilized by a second disk bandwidth consumer having a lower priority than the first disk bandwidth consumer.

21. The method recited in claim 19, wherein if the disk bandwidth is denied, the method further comprises:

determining if there is disk bandwidth available to allocate to the same disk bandwidth consumer to meet alternate disk bandwidth requirements of the disk bandwidth consumer;

allocating disk bandwidth to the disk bandwidth consumer if there is sufficient disk bandwidth available to meet the alternate disk bandwidth requirements of the disk bandwidth consumer; and denying the disk bandwidth if sufficient disk bandwidth is not available.

22. A system for processing streaming I/O, comprising:

a computing unit;

a streaming provider lookup table stored in system memory that stores a streaming bandwidth capacity for one or more streaming I/O bandwidth providers;

one or more streaming I/O bandwidth providers;

one or more streaming I/O bandwidth consumers; and a resource manager configured to receive a request from a streaming I/O bandwidth consumer requesting bandwidth from a streaming I/O bandwidth provider and reference the provider lookup table to determine if there is sufficient bandwidth available from the streaming I/O bandwidth provider to satisfy the request.

23. The system as recited in claim 22, wherein the resource manager is further configured to:

allocate streaming I/O bandwidth to a streaming I/O bandwidth consumer upon a first request if a streaming I/O bandwidth provider has sufficient streaming I/O bandwidth available to satisfy the first request;

deny streaming I/O bandwidth to the streaming I/O bandwidth consumer after the initial request if insufficient streaming I/O bandwidth is available from the streaming I/O bandwidth provider to satisfy the second request;

allocate streaming I/O bandwidth to the streaming I/O bandwidth consumer upon a second request if the streaming I/O bandwidth provider has sufficient streaming I/O bandwidth available to satisfy the second request; and deny streaming I/O bandwidth to the streaming I/O bandwidth consumer after the second request if insufficient streaming I/O bandwidth is available from the streaming I/O bandwidth provider to satisfy the second request.

24. The system as recited in claim 22, the resource manager is further configured to allow a second streaming I/O bandwidth consumer to pre-empt a first streaming I/O bandwidth consumer and allocate the streaming I/O provider bandwidth allocated to the first streaming I/O bandwidth consumer to the second streaming I/O bandwidth consumer.

25. The system as recited in claim 22, wherein the resource manager is further configured to determine the streaming I/O bandwidth capacity of each of the streaming I/O bandwidth providers.

26. The system as recited in claim 22, wherein the resource manager is further configured to assign a priority to each of the one or more streaming I/O bandwidth consumers and allocate bandwidth from the one or more streaming I/O bandwidth providers among the one or more streaming I/O bandwidth consumers based on the priority of each of the one or more streaming I/O bandwidth consumers.

27. The system as recited in claim 22, wherein the one or more streaming I/O bandwidth consumers are configured to repeatedly submit a request for streaming I/O bandwidth to the resource manager until the request is allocated.

28. The system as recited in claim 22, wherein the one or more streaming I/O bandwidth consumers are configured to:

submit a first request for streaming I/O bandwidth to the resource manager, submit a second request for streaming I/O bandwidth to the resource manager in the event that the first request is denied, the second request having different requirements than the first request.

29. The system as recited in claim 22, wherein the one or more streaming I/O bandwidth providers are configured to transmit streaming I/O bandwidth information to the resource manager.

30. The system as recited in claim 22, wherein the one or more streaming I/O bandwidth providers are configured to transmit streaming I/O bandwidth capacity to the resource manager.

31. The system as recited in claim 22, wherein the one or more streaming I/O bandwidth providers are configured to transmit an amount of unused streaming I/O bandwidth to the resource manager.

32. The system as recited in claim 22, wherein the streaming I/O bandwidth provider is a processor.

33. The system recited in claim 22, wherein the streaming I/O bandwidth provider is a peripheral storage device.

34. A streaming I/O bandwidth provider that provides unenforced allocation of streaming I/O processor bandwidth to one or more streaming I/O consumers, comprising:

a processor; and a processor bandwidth manager configured to:

allocate processor bandwidth requested by a first streaming I/O processor bandwidth consumer if sufficient processor bandwidth is available;

deny processor bandwidth requested by the first streaming I/O processor bandwidth consumer; and reclaim allocated processor bandwidth and re-allocate the reclaimed processor bandwidth to a second streaming I/O processor bandwidth consumer in the event that the processor bandwidth manager has allocated processor bandwidth to the first streaming I/O processor bandwidth consumer.

35. The streaming I/O processor bandwidth provider as recited in claim 34, wherein the processor bandwidth manager is configured to reallocate previously allocated streaming I/O processor bandwidth without terminating the operation of the first streaming I/O processor bandwidth consumer.

36. One or more computer readable media containing computer executable instructions that, when executed by a computer, perform the following:

determining whether to allocate streaming I/O bandwidth from a disk to a streaming I/O bandwidth consumer according to a first request, or to deny the bandwidth requested in the first request;

in the event that the requested bandwidth is denied, determining whether to allocate streaming I/O bandwidth from the disk to the streaming I/O bandwidth consumer according to a second request or to deny the bandwidth requested in the second request; and the first request and the second request having different criteria.

37. The one or more computer readable media as recited in claim 36, wherein the determining comprises determining if there is sufficient unused streaming I/O bandwidth available from the disk to satisfy the requests from the streaming I/O bandwidth consumer.

38. The one or more computer readable media as recited in claim 36, wherein the determining comprises determining if the streaming I/O bandwidth consumer has a higher priority than an active streaming I/O bandwidth consumer that is utilizing bandwidth of the disk and, if so, re-allocating bandwidth utilized by the active streaming I/O bandwidth consumer to the streaming I/O bandwidth consumer.

39. The one or more computer readable media as recited in claim 36, wherein allocated streaming I/O bandwidth of the disk can be re-allocated to a second streaming I/O bandwidth consumer without terminating the operation of the streaming I/O bandwidth consumer.

* * * * *

UNITED STATES PATENT AND TRADEMARK OFFICE
CERTIFICATE OF CORRECTION

PATENT NO. : 6,748,443 B1 Page 1 of 1
DATED : June 08, 2004
INVENTOR(S) : Parry et al.

It is certified that error appears in the above-identified patent and that said Letters Patent is hereby corrected as shown below:

Column 3,
Line 2, replace "thee" with -- the --.

Colujmn 11,
Line 15, replace "providers" with -- providers; --.
Line 45, insert --, -- between "provider" and "in".
Line 57, replace "claim 10" with -- claim 7, --.
Line 67, replace "tie" with -- the --.

Column 12,
Line 1, replace "preempted" with -- pre-empted --.
Line 6, delete "a" between "amount" and "of".
Line 58, delete "to" between "not" and "available".

Column 13,
Line 65, insert -- wherein -- after the words "claim 22,".

Signed and Sealed this

Seventeenth Day of August, 2004

JON W. DUDAS
*Acting Director of the United States Patent and Trademark Office*